United States Patent [19]

MacCracken et al.

[11] Patent Number: 5,005,368
[45] Date of Patent: Apr. 9, 1991

[54] COOLNESS STORAGE AIR CONDITIONER APPLIANCE

[75] Inventors: Calvin D. MacCracken, Englewood, N.J.; Brian M. Silvetti, Tomkins Cove, N.Y.

[73] Assignee: Calmac Manufacturing Corporation, Englewood, N.J.

[21] Appl. No.: 476,257

[22] Filed: Feb. 7, 1990

[51] Int. Cl.$^5$ ................................................ F25C 1/00
[52] U.S. Cl. ........................................ 62/139; 62/59; 62/431
[58] Field of Search ........................... 62/59, 139, 431

[56] References Cited

U.S. PATENT DOCUMENTS

| | | | |
|---|---|---|---|
| 2,160,760 | 5/1939 | Smith | 62/59 X |
| 2,436,389 | 2/1948 | Kleist | 165/10 A X |
| 4,170,261 | 10/1979 | Laing et al. | 165/10 A |
| 4,270,523 | 6/1981 | Van Heel | 165/10 A |
| 4,403,644 | 9/1983 | Hebert | 165/10 A |

Primary Examiner—William E. Wayner
Attorney, Agent, or Firm—Charles J. Brown

[57] ABSTRACT

A coolness storage air conditioner appliance in which water is frozen in chambers during protracted charging cycles by refrigeration apparatus of sufficiently low capacity to permit heat discharge into an interior air space and is melted during brief cooling cycles by air circulated through passageways in heat-transfer relation with the ice, the discharged circulated air thereby cooling the interior air space.

13 Claims, 2 Drawing Sheets

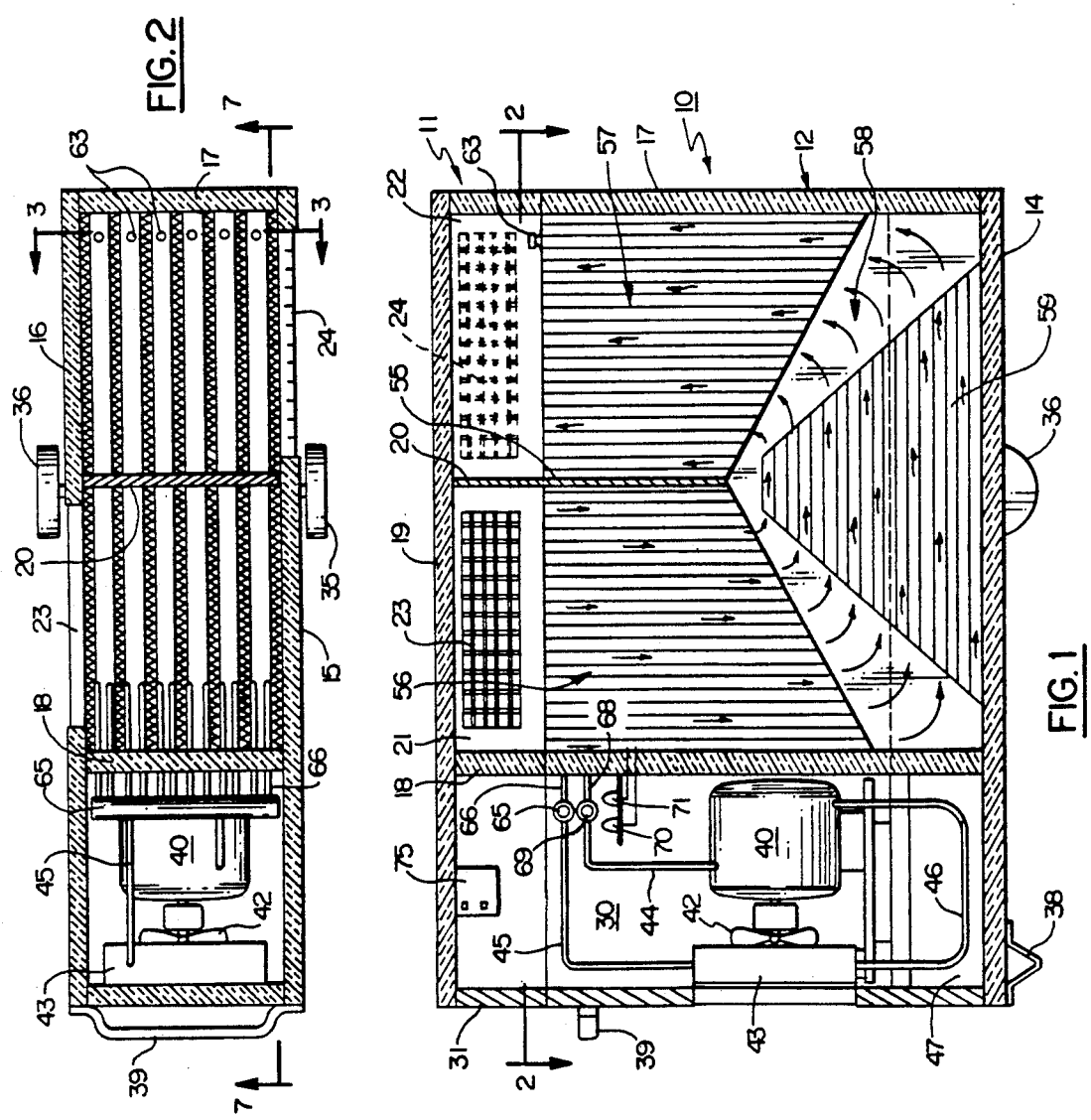

COOLNESS STORAGE AIR CONDITIONER APPLIANCE

BACKGROUND OF THE INVENTION

In many regions air conditioning accounts for close to half the residential electrical power consumption during peak demand summer periods, which is to say during the hottest afternoon and evening hours. Utilities frequently offer reduced rates during off-peak periods to encourage economical demand shifts but no residential appliances are known to be available for storing coolness to be drawn upon later when air conditioning is required. For winter heat storage hot brick radiators for residential use are available which are capable of storing heat during off-peak periods for subsequent use during high-load cycles, but comparable equipment has not been developed for cooling residential air spaces.

Coolness storage has long been practiced for purposes other than residential air conditioning. For example U.S. Pat. No. 4,036,621 discloses an ice bank in which a relatively small condensor-compressor builds ice to be melted later in water to cool beverages. It is not concerned with cooling of air or with residential air conditioning. U.S. Pat. No. 4,346,569 teaches an air conditioning system wherein winter cold is utilized to freeze ice in underground chambers and thereafter during hot summer conditions that coolness is transferred by a circulating heat exchange liquid to an air conditioning duct where it is used to cool warm air entering a building. It is not concerned with an appliance for peak shaving of electrical loads on the basis of daily cycles.

The principal object of the present invention is to provide a portable air conditioning appliance wherein a condensor-compressor of limited capacity powered by 110 volt household electricity operates a refrigeration system which is small enough to discharge heat into an interior residential air space, thus storing coolness in the form of ice which can be utilized later to cool air in the residential air space.

SUMMARY OF THE INVENTION

The invention provides a coolness storage air conditioner appliance for cooling an interior air space. A thermally insulated housing is included in which a plurality of thermally conductive closely spaced wall members define water chambers and air passageways. The respective water chambers are adapted to contain water. Evaporator conduit means are adapted to be in heat transfer contact with water in the respective water chambers. Circulating means are included for moving air through the passageways from and into the interior air space. Compressor-condenser refrigeration means are provided of a limited refrigerating capacity permitting heat discharge directly into the interior air space and adapted to circulate a refrigerant through the conduit means. By this apparatus water in the water chambers can be frozen during protracted charging cycles and melted during brief cooling cycles to cool the interior air space.

In a preferred form of the invention the wall members are a plurality of vertical closely spaced parallel longitudinal metal walls defining alternating water chambers and air passageways. Each wall member is preferably of double laminations defining between them the conduit means. Thermostatically operated switching means are preferably included for automatic operation of the refrigeration means when water in the chambers is fully melted and for ceasing operation of the refrigeration means when water in the chambers is fully frozen.

BRIEF DESCRIPTION OF DRAWINGS

FIG. 1 is a longitudinal section of the air conditioner appliance of the invention taken through one of the air pasageways along the line 1—1 of FIG. 2;

FIG. 2 is a horizontal section taken along the line 2—2 of FIG. 1;

FIG. 3 is a vertical section taken along the line 3—3 of FIG. 2;

DESCRIPTION OF PREFERRED EMBODIMENT

Figure 4:
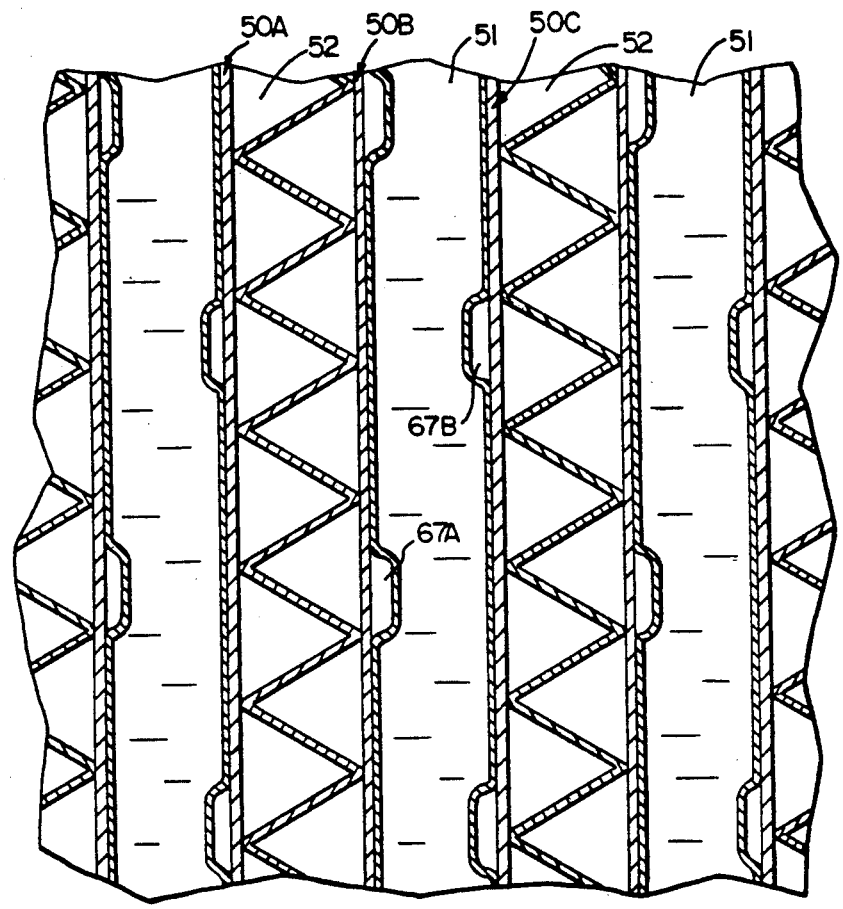
FIG. 4 is an enlarged fragmentary horizontal section taken along the line 4—4 of FIG. 3.

As seen in FIGS. 1 to 3, the coolness storage air conditioner appliance of the invention includes a box-like thermally insulated housing 10 comprising a lid portion 11 and a body portion 12 hinged together at 13. The housing 10 is of narrow lateral width relative to its height and longitudinal length. It includes a floor 14, a front panel 15, a rear panel 16, an outer end panel 17, an inner end panel 18 and a top panel 19.

Figure 5:
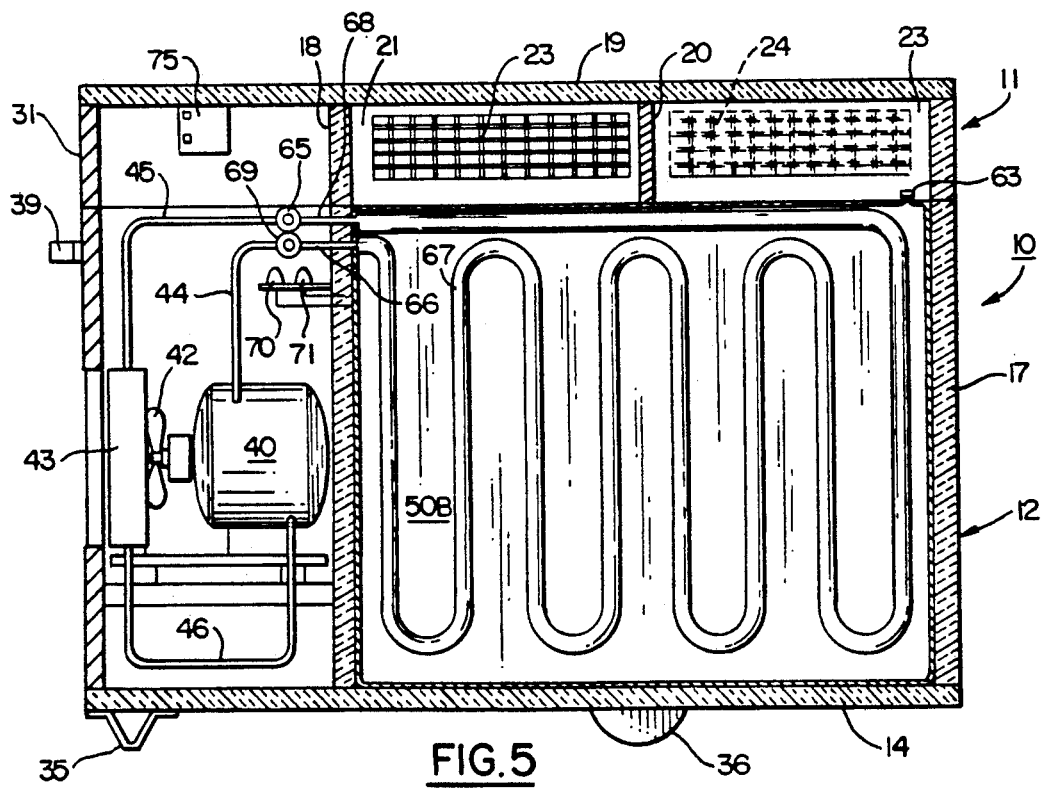
FIG. 5 is a vertical section taken along the line 5—5 of FIG. 3.

A vertical lateral bulkhead 20 shown in section in FIGS. 1 and 5 divides the upper lid portion 11 of the housing 10 into an upper inlet manifold 21 and upper outlet manifold 22. A warm air inlet port 23 is provided in the rear panel 16 to communicate with the upper inlet manifold 21. A cool air outlet port 24 is formed in the front panel 15 of the housing 10 to communicate with the upper outlet manifold 22. An electric blower 26 is included in the upper outlet manifold 22 to force air out of the outlet port 25 and, as will be described hereafter, thereby draw air in through the upper inlet port 23.

The floor and top panels 14 and 19 and the front and back panels 15 and 16 of the housing 10 extend beyond the inner end panel 18 to the left as shown in FIGS. 1, 2 and 5 to provide a refrigeration compartment 30. A second end panel 31, which includes portions both on the lid portion 11 of the housing and the body portion 12 thereof, closes off the left outer end of the refrigeration compartment 30.

The appliance of the invention is provided with wheels 35 and 36 located beneath the center of gravity of the housing 10. Skid members 37 and 38 are also provided on the floor panel 14 beneath the outer end of the refrigeration compartment 30 remote from the wheels 35 and 36. A handle 39 is included on the exterior of the wall member 31 above the skid members 37 and 38.

Within the refrigeration compartment 30 is a conventional compressor 40, fan motor 41, fan 42 and condenser coil 43 of a domestic-size refrigeration system. The system also includes a conventional refrigerant return tube 44 leading into the compressor 40, a refrigerant outlet tube 45 leading from the condenser coil 43, and an interconnecting tube 46 for directing hot discharge gas to the condenser coil 43 from the compressor 40. The interconnecting tube 46 passes in loops through an evaporation tray 47 which receives condensate during the cooling cycle of the appliance. The condensate is evaporated back to ambient air during the refrigerating cycle in a manner conventional to domestic refrigerators. The tray 47 also has the capacity to receive water leakage from one of the water chambers of the appliance which are described hereinafter.

Within the housing 10 extending from the inner end panel 18 to the outer end panel 17 are twelve vertical wall members, three of which are identified as 50A, B and C in detail in FIG. 4. The wall members are closely spaced parallel to one another and preferably are of sheet metal. They extend the length of the housing 10 beneath the upper inlet and outlet manifolds 21 and 22. They define six water chambers 51 alternating with seven air passageways 52, an adjoining pair of which are identified in FIG. 4. Typical dimensions for the water chambers 51 are a thickness of one inch, a height of twenty-four inches and a width of thirty inches each holding 3.3 gallons of water. Each water chamber is also enclosed at the top but includes an upper opening with a fill cap 53 as shown in FIGS. 1, 2 and 5.

As shown in FIGS. 1 and 2, seven vertical lateral baffles 55 extend downwardly between every other pair of wall members as extensions of the lateral bulkhead 20, thus dividing each of the air passageways 52 into two sections. One is a down-flow section 56 from the inlet manifold 21 and the other is an up-flow section 57 to the outlet manifold 22. These down-flow and up-flow sections 56 and 57 are connected by a lower longitudinal cross-flow section 58. In the cross-flow section 58 vanes 59 in the form of corrugations 60 shown in FIG. 3 are provided for directing flow of air from the down-flow section 56 across to the up-flow section 57. Corrugated dividers 61 are provided in each of the respective seven air passageways 52 as shown in FIG. 4 to support the associated wall members 50A and 50B while permitting air flow.

In the refrigeration compartment 30 the refrigerant tube 45 enters a lateral inlet header 65 from which twelve feeder tubes 66 extend through the inner end panel 18 to respective evaporator conduits 67 disposed in a series of six pairs of closed loops as shown in FIG. 5, one pair for each respective water chamber 51. Each of the wall members 50A, B and C is of double thickness, which is to say of metal laminations, preferably of steel, which are substantially though not entirely in full surface-to-surface welded contact with one another. In each wall member one of the laminations, that facing into the associated water chamber 51, is stamped with a generally rectangular indentation which with the flat other lamination defines an evaporator conduit 67. As shown in FIG. 4 one evaporator conduit 67A is within the wall member 50B and another evaporator conduit 67B is within the wall member 50C, with their loops vertically offset from one another. The evaporator conduits 67 are therefore in close surface-to-surface heat transfer contact with water in the water chambers 51. Each of the twelve conduits 67 has an outlet tube 68 which carries the refrigerant back to a lateral outlet header 69 shown particularly in FIGS. 1, 2 and 5. From the outlet header 69 the tube 44 carries the refrigerant back to the compressor 40.

Thermostatically operated switches 70 and 71 shown schematically in FIGS. 1 and 5 are adapted automatically to turn on the refrigeration system when water in the chambers 51 is fully melted and cease its operation when water in the chambers 51 is fully frozen. Specifically, the switches 70 and 71 close to turn on the refrigeration system when the water is tepid at about 45° F. to 50° F. and the ice is entirely melted, and they open to turn the refrigeration system off when the water is entirely frozen and sub-cooled to about 20° F. to 25° F.

For this purpose single or paired thermostatic switches are employed which respond to high differential temperature. Such switches are of the kind used to operate furnace fans between a high-temperature "on" condition not reached until well after a furnace burner ignites and a low-temperature "off" condition reached well after the burner ceases and the furnace cools somewhat.

From the foregoing description it will be apparent that the appliance of the invention is portable. When the six water chambers 51 are filled with water the total apparatus weighs approximately 345 lbs. However this weight is centered over the wheels 35 and 36 which permits movement of the appliance by hand. The appliance is intended to be shipped dry and the chambers 51 are to be filled with water by the user. This is easily done by lifting the hinged lid portion 11 of the housing 10, removing the fill caps 53 and filling the six chambers 51 almost but not quite to the top, leaving some air space for expansion during freezing. Being portable the appliance may be moved about a house from kitchen to living area to bedroom as required. When operated in the cooling cycle the refrigeration system is shut down and only the blower is powered. Control panel means indicated schematically as 75 in FIG. 1 then permits a high cooling setting of one-half ton or 6,000 Btu's/hr. for about 5 hours or a low cooling setting of one-third ton or 4,000 Btu's/hr. for about 8 hours. When operated in the charging cycle the blower is shut off and the refrigeration system quietly chills the refrigerant over a protracted period to progressively freeze the water in the chambers 51 to ice. The heat output of the refrigeration system in the charging cycle is comparable to that of a domestic refrigerator and therefore can discharge its heat during the charging cycle into the room to be later cooled. In contrast the heat discharge of a conventional room air conditioner is vastly greater and requires window mounting with exhaust to the outside of the building. Since the appliance of the invention is not window mounted there is no problem of security, corrosion, excess dirt, seasonal removal and reinstallation, blockage of view, outdoor air leakage, fitting to the window, short life, etc. The compressor 40 of the small refrigeration system of the appliance permits use with conventional 110 volt power.

In summary water in the chambers 51 can be frozen during protracted charging cycles and melted during brief cooling cycles to cool an interior air space. The user may correlate these cycles to low-cost off-peak periods and high-cost high-load periods. In the cooling cycle the blower 26 quietly draws air through the inlet port 23 and down the inlet section 56 of the air passageways 52, through the cross-flow section 58 and then up the outlet section 57 to the outlet manifold 22 and the outlet port 24. This causes the circulating air to be thoroughly chilled by passing in close heat exchange contact with the wall members 50A and 50B which in turn have been chilled by the frozen ice in the various water chambers 51. As coolness is removed from the ice by the circulating air the water in the chambers 51 eventually melts and when melting is complete the refrigeration system automatically commmences operation to send chilled refrigerant through the evaporator conduits 66 which are also in close surface-to-surface heat exchange contact with the chambers 51, thus freezing the water.

The operation of the appliance of the invention can be partly automatic, switching the cooling cycle to the charging cycle when the water in the chambers 51 is fully melted. The operator may selectively switch back from the charging cycle to the cooling cycle as needed.

Certain modifications can readily be made in the foregoing preferred embodiment and be within the scope of the invention. For example, the evaporator conduits may be tubes mounted within the double thickness wall members or mounted against the water chamber side of single thickness wall members. Alternatively, the evaporator conduits may be centralized within the respective water chambers and held in place by appropriate spacers, in which case a single evaporator tube would suffice for each water chamber, a total of six rather than twelve. The water chambers may also be formed as blow-molded plastic containers providing their own wall members for defining the air passageways, or be formed as flexible plastic bags supported by separate wall members. Cross bracing spacers may be provided within each water chamber to prevent crushing of the wall members defining a still-empty water chamber when that next to it is filled with water.

The scope of the foregoing invention is to be determined by the following claims.

I claim:
1. A coolness storage air conditioner appliance for cooling an interior air space comprising
   (a) a box-like thermally insulated housing of narrow lateral width relative to its height and longitudinal length and including a vertical bulkhead dividing the housing into upper inlet and outlet manifolds,
   (b) a plurality of thermally conductive closely spaced wall members defining water chambers and air passageways in the housing,
   (c) the water chambers being adapted to contain water in heat transfer contact with the associated wall members,
   (d) evaporator conduit means adapted to be in heat transfer contact with water in the associated water chambers,
   (e) circulating means for moving air through said passageways from and into said interior air space, and
   (f) compressor-condenser refrigeration means of a limited refrigerating capacity permitting heat discharge directly into said interior air space and adapted to circulate a refrigerant through said conduit means,
   (g) whereby water in said chambers can be frozen during protracted charges cycles and melted during brief cooling cycles to cool said interior air space.

2. An air conditioner appliance according to claim 1 wherein inlet and outlet ports are provided in the housing communicating the respective upper inlet and outlet manifolds with the interior air space.

3. An air conditioner appliance according to claim 1 wherein the wall members are vertical and are closely spaced parallel to one another and define alternating water chambers and air passageways.

4. An air conditioner appliance according to claim 1 which includes vertical lateral baffles extending downwardly from the lateral bulkhead and dividing each passageway into a down-flow section from the inlet manifold and an up-flow section to the outlet manifold connected by a lower longitudinal cross-flow section.

5. An air conditioner appliance according to claim 4 wherein vanes are provided in the cross-flow section for directing flow of air.

6. An air conditioner appliance according to claim 1 wherein spacer means are included in each of the air passageways for supporting the wall members while permitting air flow.

7. An air conditioner appliance according to claim 1 which includes thermostatically operated switching means adapted automatically to operate the refrigeration means when water in said chambers is fully melted and cease operation of said refrigeration means when water in said chambers is fully frozen.

8. An air conditioner appliance according in claim 1 wherein the evaporator conduit means are disposed in a series of closed loops within the associated wall members.

9. An air conditioner appliance according to claim 8 wherein the wall members are of laminated form with the conduit means defined betwen laminations thereof.

10. An air conditioner appliance according to claim 1 wherein the circulating means is a blower.

11. A coolness storage air conditioner appliance for cooling an interior air space comprising
   (a) a box-like thermally insulated housing of narrow lateral width realative to its height and longitudinal length,
   (b) a vertical lateral bulkhead dividing the housing into upper inlet and outlet manifolds,
   (c) inlet and outlet ports in the housing communicating the respective upper inlet and outlet manifolds with the interior air space,
   (d) a plurality of vertical closely spaced parallel longitudinal wall members extending the length of the housing beneath the upper inlet and outlet manifolds and defining alternating water chambers and air passageways,
   (e) the respective water chambers being adapted to contain water in heat transfer contact with the associated wall members,
   (f) vertical lateral baffles extending downwardly from the lateral bulkhead and dividing each passageway into a down-flow section from the inlet manifold and an up-flow section to the outlet manifold both connected by a lower longitudinal cross-flow section of air,
   (g) dividers in each of the air passageways for supporting the wall members while permitting air flow,
   (h) evaoporator conduit means within each wall member disposed in a series of closed loops and adapted to be in heat transfer contact with water in the associated water chambers,
   (i) a blower for circulating air through the inlet manifold and the down-flow sections of the air passageways and across the cross-flow section and through the up-flow sections to the outlet manifold and out the outlet port to the interior air space,
   (j) compressor-condensor refrigeration means mounted outside said housing and being of a limited refrigerating capacity permitting heat discharge directly into said interior air space and adapted to circulate a refrigerant through said conduit means, and
   (k) whereby water in said chambers can be frozen during protracted charging cycles and melted during brief cooling cycles to cool said interior air space.

12. A coolness storage air conditioner appliance for cooling an interior air space comprising
   (a) a thermally insulated housing, (b) a plurality of thermally conductive closely spaced wall members defining water chambers and air passageways in the housing, (c) the water chambers being adapted to contain water in heat transfer contact with the associated wall members, (d) fill cap means associated with each water chamber permitting the water chambers to be selectively filled with or emptied of water so that the appliance is portable and can be transported with empty water chambers, (e) evaporator conduit means adapted to be in heat transfer contact with water in the associated water chambers, (f) circulating means for moving air first downwardly and then upwardly through said passageways from and into said interior air space, and (g) compressor-condenser refrigeration means of a limited refrigerating capacity permitting heat discharge directly into said interior air space and adapted to circulate a refrigerant through said conduit means, (h) whereby water in said chambers can be frozen during protracted charging cycles and melted during brief cooling cycles to cool said interior air space.

13. An air conditioner applicance according to claim 12 which includes thermostatically operated switching means adapted automatically to operate the refrigeration means when water in said chambers is fully melted and cease operation of said refrigeration means when water in said chambers is fully frozen.

* * * * *